US010291462B1

(12) United States Patent
Joyce et al.

(10) Patent No.: US 10,291,462 B1
(45) Date of Patent: May 14, 2019

(54) ANNOTATIONS FOR INTELLIGENT DATA REPLICATION AND CALL ROUTING IN A HIERARCHICAL DISTRIBUTED SYSTEM

(71) Applicant: Juniper Networks, Inc., Sunnyvale, CA (US)

(72) Inventors: Roshan Joyce, Bangalore (IN); Tong Jiang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 313 days.

(21) Appl. No.: 15/397,331

(22) Filed: Jan. 3, 2017

(51) Int. Cl.
*G06F 15/173* (2006.01)
*H04L 12/24* (2006.01)
*H04L 29/08* (2006.01)

(52) U.S. Cl.
CPC .......... *H04L 41/042* (2013.01); *H04L 41/046* (2013.01); *H04L 41/14* (2013.01); *H04L 41/20* (2013.01); *H04L 67/02* (2013.01); *H04L 67/1095* (2013.01); *H04L 41/044* (2013.01)

(58) Field of Classification Search
CPC ..... H04L 41/042; H04L 41/046; H04L 41/14; H04L 41/20; H04L 67/02; H04L 67/1095
USPC ........................................ 709/223, 224, 248
See application file for complete search history.

(56) References Cited

U.S. PATENT DOCUMENTS

| | | | |
|---|---|---|---|
| 7,340,747 B1 * | 3/2008 | Zeliger ................... | G06F 9/465 709/203 |
| 2009/0313372 A1 * | 12/2009 | Streijl .................... | H04L 41/082 709/225 |
| 2011/0142078 A1 * | 6/2011 | Wong ..................... | H04J 3/0679 370/503 |
| 2015/0245160 A1 * | 8/2015 | Agrawal ........... | H04M 15/8044 455/406 |
| 2015/0309825 A1 * | 10/2015 | Farkas ................. | G06F 9/45558 718/1 |
| 2016/0094406 A1 * | 3/2016 | Phan .................... | H04L 41/0843 709/223 |

(Continued)

OTHER PUBLICATIONS

Bjorkland, "YANG—A Data Modeling Language for the Network Configuration Protocol (NETCONF)," Internet Engineering Task Force (IETF), RFC 6020, Oct. 2010, 173 pp.

(Continued)

*Primary Examiner* — Philip B Tran
(74) *Attorney, Agent, or Firm* — Shumaker & Sieffert, P.A.

(57) ABSTRACT

In general, techniques are described for providing data consistency for managed device data among network managers in a hierarchical and distributed network management system in which the network managers operate according to a microservices-based software architecture. For example, a method comprises receiving a data model for a network device, wherein the data model comprises an object and an annotation that indicates a type of scope for the object; and processing, based on the object and annotation, the data model to generate application code for a microservice application for a network manager for managing instances of the network device, wherein the application code, when compiled, and executed by the network manager, causes the network manager to replicate data associated with the object to one or more of a plurality of network managers of a distributed network managed system.

21 Claims, 9 Drawing Sheets

(56) References Cited

U.S. PATENT DOCUMENTS

2016/0112475 A1* 4/2016 Lawson ............... H04L 65/403
709/204
2016/0112521 A1* 4/2016 Lawson ................ H04L 67/16
709/227

OTHER PUBLICATIONS

Enns, "Network Configuration Protocol (NETCONF)," Internet Engineering Task Force (IETF), RFC 6241, Jun. 2011, 113 pp.

* cited by examiner

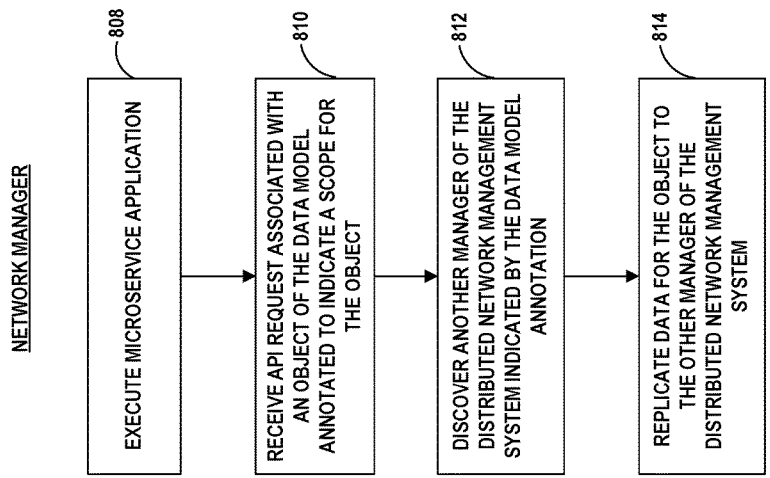
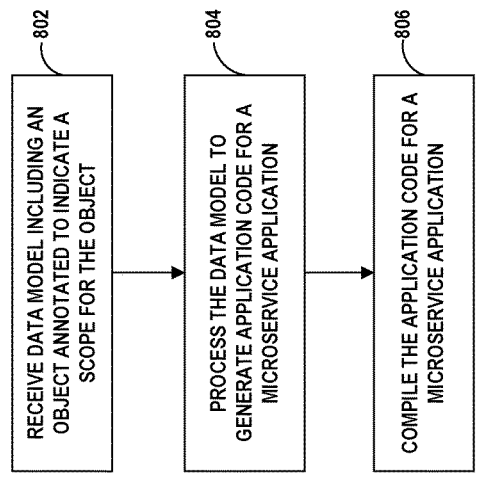
FIG. 8B
FIG. 8A

ANNOTATIONS FOR INTELLIGENT DATA REPLICATION AND CALL ROUTING IN A HIERARCHICAL DISTRIBUTED SYSTEM

TECHNICAL FIELD

The invention relates to computer networks and more particularly to distributed network managed systems.

BACKGROUND

A computer network is a collection of interconnected computing devices that exchange data and share resources. In a packet-based network, the computing devices communicate data by dividing the data into small blocks called packets. Devices within the network, such as routers and switches, forward the packets through the network from a source device to a destination device. The destination device extracts the data from the packets and assembles the data into its original form.

In a distributed network management system for a network, devices within the network may be geographically dispersed and are typically managed by a plurality of managers. A centralized network manager ("central manager") may manage regional network managers ("regional managers") that manage the network devices. The regional managers are distributed across the network, with each of the regional managers generally deployed geographically closer to the devices that they manage or, alternatively or additionally, responsible for a logical portion of the network such as an edge network of a service provider core.

SUMMARY

In general, techniques are described for providing data consistency for managed device data among network managers in a hierarchical and distributed network management system in which the network managers operate according to a microservices-based software architecture. For example, a central manager and regional managers for a network management system of a network may each be developed and deployed as a set of microservices that are each present in both the central and regional managers, where each microservice implements a set of focused and distinct features or functions and conforms to (or is usable in) an architectural pattern in which many dozens or even hundreds of microservices can be independently developed and deployed to operate as one of the managers.

The behavior and function of a microservice may vary according to whether the microservice is executing as part of a central manager or a regional manager. Thus, a microservice deployed to both a central manager and a regional manager may operate to manage a device of the network using central-specific and regional-specific data models, respectively, for the managed device, where the various data models may nevertheless overlap in some attributes, methods, and/or classes and be developed using a unified data model but may include annotations that define a scope and consistency level to be applied to classes, attributes, and/or methods of the data model. A scope annotation may define whether a class, attribute, or method exists in a data model for a regional or central manager. A consistency level may define the strength of consistency required among data models of the managers for a managed device. By generating microservice code based in part on an annotated data model, the techniques may facilitate a unified data model for a managed device while permitting flexible development of a microservice for use in different applications (e.g., central versus regional manager).

In some examples, microservices compiled based on the generated microservice code enforce the consistency of classes, attributes, and methods, at the consistency level and scope specified by annotations for these items. For instance, microservices may perform data replication and/or call routing across a distributed network management system for create, read, update, and delete ("CRUD") operations performed with respect to attributes of a managed device. As a result, the techniques may provide consistency for replicated data for managed devices in the distributed system. In some cases, the consistency may be applied transparently using microservice code automatically generated from annotated data models. Such consistency enforcement may leverage the microservice infrastructure (service discovery, e.g.) to relieve the microservice developer of this task at the application or development level.

In one example, a method comprises: receiving, by a computing device, a data model for a network device, wherein the data model comprises an object and an annotation that indicates a type of scope for the object; and processing, by the computing device based at least on the object and annotation, the data model to generate application code for a microservice application for a network manager for managing instances of the network device, wherein the application code, when compiled, and executed by the network manager, causes the network manager to replicate data associated with the object to one or more of a plurality of network managers of a distributed network management system for managing a network that includes at least one instance of the network device.

In another example, a method comprising: receiving, by a microservice of a first network manager of a plurality of network managers of a distributed network management system for managing a network that includes at least one instance of a network device, a request for an object of a data model for the network device and stored by the first network manager, wherein the data model comprises the object and an annotation that indicates a type of scope for the object; applying, by the microservice, an operation indicated by the request to the object; replicating, by the microservice based at least in part on instructions generated based on the annotation, data associated with the object to a second network manager of the plurality of network managers to cause the second network manager to apply the operation to an object stored by the second network manager.

In another example, a computing device comprises: one or more hardware-based processors, implemented using discrete logic circuitry, configured to: receive a data model for a network device, wherein the data model comprises an object and an annotation that indicates a type of scope for the object; and process, based at least on the object and annotation, the data model to generate application code for a microservice application for a network manager for managing instances of the network device, wherein the application code, when compiled, and executed by the network manager, causes the network manager to replicate data associated with the object to one or more of a plurality of network managers of a distributed network management system for managing a network that includes at least one instance of the network device.

In another example, a computing device comprises a first network manager, the computing device comprising: one or more hardware-based processors, implemented using discrete logic circuitry, configured to: receive, by a microservice of the first network manager of a plurality of network managers of a distributed network management system for managing a network that includes at least one instance of a network device, a request for an object of a data model for the network device and stored by the first network manager, wherein the data model comprises the object and an annotation that indicates a type of scope for the object; apply, by the microservice, an operation indicated by the request to the object; replicate, by the microservice based at least in part on instructions generated based on the annotation, data associated with the object to a second network manager of the plurality of network managers to cause the second network manager to apply the operation to an object stored by the second network manager.

The details of one or more examples are set forth in the accompanying drawings and the description below. Other features, objects, and advantages of the invention will be apparent from the description and drawings, and from the claims.

BRIEF DESCRIPTION OF DRAWINGS

FIG. 8A is a flowchart illustrating an example mode of operation for a development platform to generate and compile microservices based on annotations specified for a data model for network devices of a distributed network management system, in accordance with the techniques of this disclosure.

FIG. 8B is a flowchart illustrating an example mode of operation for a network manager microservice to enforce data consistency among multiple network managers that manage a network device modeled by a data model having an object with a specified scope and consistency level, according to techniques of this disclosure.

Like reference characters denote like elements throughout the figures and text.

DETAILED DESCRIPTION

Figure 1:
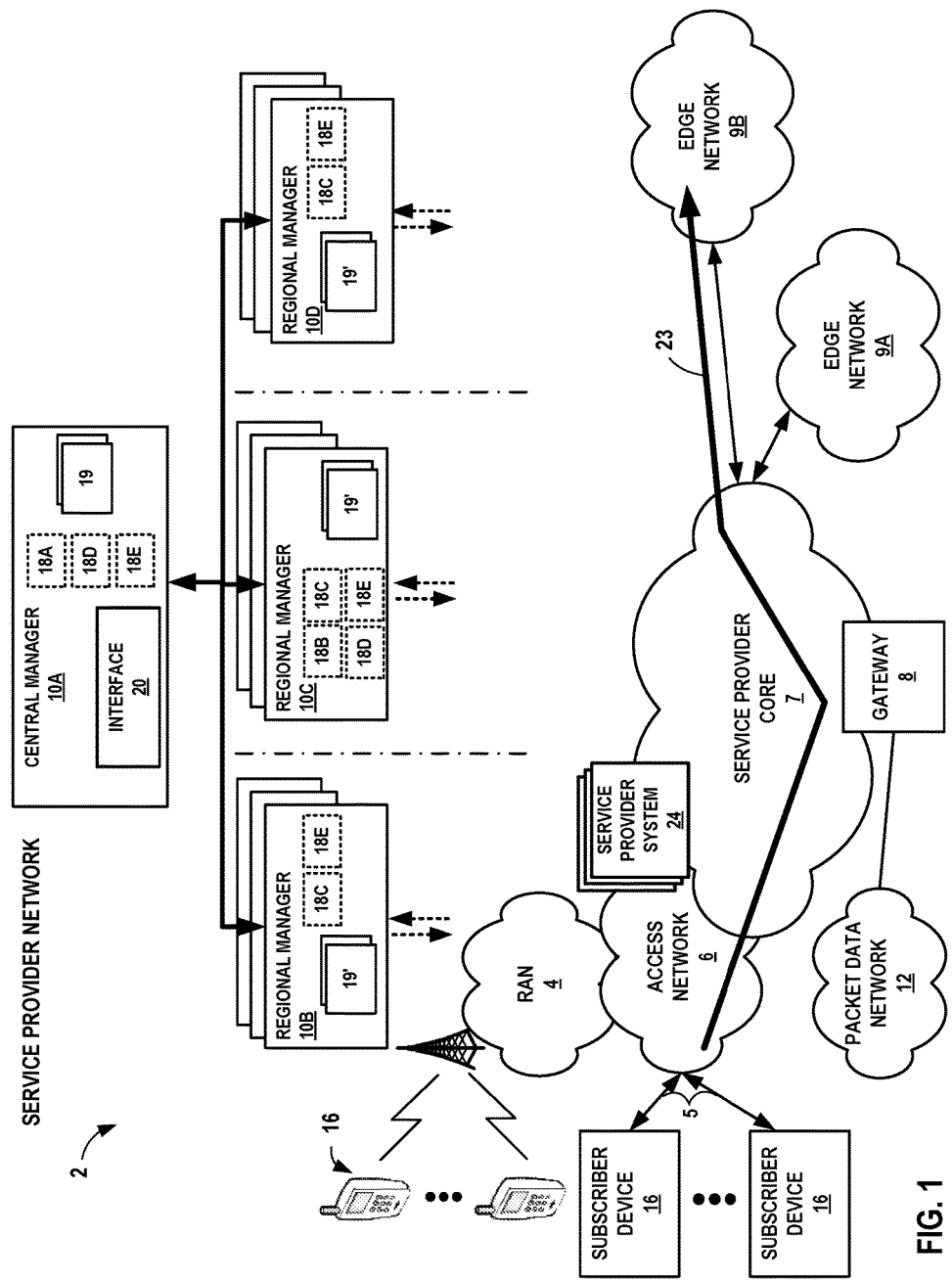
FIG. 1 is a block diagram illustrating an example distributed network management system in which a network device may configure annotations and rules for intelligent data replication and/or call routing in the hierarchical distributed system, in accordance with the techniques of this disclosure.

FIG. 1 illustrates an example network system in accordance with techniques described herein. The example network system of FIG. 1 includes a distributed network management system 2 ("network system 2") that provides packet-based network services to subscriber devices 16A-16N (collectively, "subscriber devices 16"). That is, network system 2 provides authentication and establishment of network access for subscriber devices 16 such that the subscriber device may begin exchanging data packets with PDN 12, which may represent an internal or external packet-based network such as the Internet. Although described with respect to a service provider operating a service provider network system 2, network system 2 may in some examples represent an enterprise network managed by a large enterprise. In addition, although described with respect to "subscribers" that connote end-users of a service provider network services, the techniques described herein are similarly applicable to "customers" of the service provider and to customer devices such as cell towers, multi-tenant units (MTUs), residential aggregation points, and so forth. Examples of customers may include universities, businesses, or any other entities that purchase, lease, or otherwise use services provided by network system 2.

In the example of FIG. 1, network system 2 includes access network 6 ("access network 6") that provides connectivity to packet data network (PDN) 12 and edge networks 9 via service provider core network 7 and gateway 8. Service provider core network 7 and PDN 12 provide packet-based services that are available for request and use by subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of network system 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links that comprise wired and/or wireless communication links. The term "communication link," as used herein, comprises any form of transport medium, wired or wireless, and can include intermediate nodes such as network devices.

Each of access links may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 may include multiple "access" segment coupled to an aggregation segment and/or backhaul network owned or leased by the service provider. An access node of an access network couples to the customer premises equipment (CPE) to process subscriber packets at layer 2 (L2) or higher. Access nodes may include digital subscriber line access multiplexors (DSLAMs), multi-tenant units (MTUs), passive optical network (PON) optical line termination devices, cell site gateways (CSGs), eNode Bs, and so forth.

Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Transport nodes of the access network connect access nodes to border nodes that enable inter-region packet transport. Border nodes may include area border routers and autonomous system boundary routers (ASBRs). In the illustrated example, border nodes (not shown) couple access network 6 to core network 7.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

Access network 6, core network 7, and edge networks 9 may include service nodes that apply services to subscriber packets. Service node examples include L2 provider edge (PE) or L3 PE routers, broadband network gateway (BNGs), peering routers, content servers, media gateways, base station controllers, and so forth. Illustrated gateway 8 includes an example of a service node.

In examples of network system 2 that include a wireline/broadband access network, gateway 8 may represent a Broadband Network Gateway (BNG), a Broadband Remote Access Server (BRAS), MPLS Provider Edge (PE) router, core router, L2/L3 PE router, or gateway, for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

Network system 2 additionally includes, in this example, edge networks 9A-9B (collectively, "edge networks 9"). In some examples, edge networks 9 may represent, e.g., business edge networks, broadband subscriber management edge networks, mobile edge networks, customer sites such as enterprise branch offices, or a combination thereof. In some examples, any of edge networks 9 may offer service provider managed network-hosted Value Added Services (VAS) including application-aware, and subscriber-aware services and charging, for instance. Access network 6 of FIG. 1 is also an example of an edge network for network system 2. Any of edge networks 9 may alternatively represent a data center/value-added services complex that offers services by a computing environment comprising, e.g., a scalable cluster of general computing devices, such as x86 processor-based servers. As another example, the computing environment may comprise a combination of general purpose computing devices and special purpose appliances.

As virtualized, individual network services provided by service nodes of the data center can scale through the allocation of virtualized memory, processor utilization, storage and network policies, as well as by adding additional load-balanced virtual machines. In one example, edge network 9A includes a data center that comprises a set of interconnected, high-performance yet off-the-shelf packet-based routers and switches that implement industry standard protocols. In one example, edge network 9A includes a data center that comprises off-the-shelf components that provide Internet Protocol (IP) over an Ethernet (IPoE) point-to-point connectivity.

A network service provider that administers at least parts of network system 2 typically offers services to subscribers associated with devices, e.g., subscriber devices 16, which access the service provider network. Services offered may include, for example, traditional Internet access, Voice-over-Internet Protocol (VoIP), video and multimedia services, security services, and linking customer sites through the core network 7 using one of a point-to-point Ethernet service, multipoint-to-multipoint Ethernet service, point-to-multipoint Ethernet service, full-mesh L3VPN, and hub-and-spoke L3VPN, for instance. As described above with respect to access network 6, core network 7 may support multiple types of access network infrastructures that connect to service provider network access gateways to provide access to the offered services.

In general, any one or more of subscriber devices 16 may request authorization and data services by sending a session request to gateway 8. Subscriber devices 16 may send subscriber data traffic toward service provider core network 7 in order to access and receive services provided by PDN 12 or edge networks 9, and such packets may traverse service provider core 7 as part of at least one packet flow. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

A network operator employs a network of managers 10A-10D (collectively, "managers 10") to provision services within service provider network 2 to provide access for subscriber devices 16 to requested services. Managers 10 each provides a high-level manager for configuring and managing various and respective domains of network system 2 (e.g., core network 7, access network 6, and edge networks 9). For example, central manager 10A ("central manager 10A") may maintain a high-level abstract data model for the subscriber devices, including resources, topology, and services across regions. Central manager 10A may also serve as a proxy to distribute requests to regional managers 10B-10D ("regional managers 10") and gather results from the regional managers. Regional managers 10B-10D are deployed geographically closer to network devices for which they manage. Each of managers 10 may maintain a separate database representing network devices managed by the manager. The database for each manager may include data for multiple network devices according to the unified data model.

Network system 2 may include a service provider system 24. In general, service provider system 24 may send requests for network services to any of managers 10 that cause the manager to validate, provision, and/or manage services provided by network system 2.

In some examples, service provider system 24 is implemented and operated by the service provider that manages network system 2. In such examples, customers of the service provider may interact with service provider system 24 using a client device (not shown). For instance, service provider system 24 may provide a portal that includes a graphical user interface and/or application programming interface (API), which allow customers to submit requests for network services. In some examples, service provider system 24 may be owned, operated, and/or maintained by the customer rather than the service provider that manages network system 2.

Service provider system 24 may send messages to interface 20 of managers 10 to request network services, such as interface 20 of central manager 10A. In some examples, interface 20 is implemented according to a stateless, client-server communications architecture. The stateless, client-server communications architecture may rely on a protocol that is cacheable. As an example, interface 20 may be implemented according to a representational state transfer (REST) or HTTP software architecture to send and receive messages with service provider system 24.

To submit requests to managers 10, service provider system 24 may generate messages that include service requests. A service request may include a definition of one or more services and/or resources of a network requested by a customer.

In response to input provided by a customer to request a service, service provider system 24 may generate a service request defining the service. Service provider system 24 sends a message including the service request to interface 20. A manager 10 that receives the message may validate the request included in the message and provision the service if sufficient resources exist to satisfy the request. In this way, interface 20 may provide a flexible service abstraction layer for managers 10 that can support fast-changing service types, adapt to real time network resources, and enforce business logic.

Service provider system 24 may be implemented as hardware, software, and/or a combination of hardware and software. Although shown as a standalone system in FIG. 1, any set of functionality of service provider system 24 described in this disclosure may be implemented in managers 10, gateway 8, or any other suitable device.

Managers 10 facilitate dynamic provisioning of routing and switching network elements using routing protocols such as Border Gateway Protocol (BGP) and Path Computation Element Protocol (PCEP), management provisioning protocols (e.g., NETCONF/YANG), and emerging software-defined networking (SDN) protocols (e.g., OpenFlow). In some examples, network managers may utilize data modeling language such as YANG as described in M. Bjorklund et al., "YANG—A Data Modeling Language for the Network Configuration Protocol (NETCONF)," Request for Comments 6020, October 2010, Internet Engineering Task Force (IETF), the entire contents of which is incorporated by reference herein, to define data models for network devices. A data model for a network element may comprise a set of objects, their capabilities, and the relationships between the objects.

NETCONF is a protocol to request information from and make configuration changes to the data model of a network device. In the example of FIG. 1, managers 10 may use NETCONF to discover network devices of their respective domains and configure the network devices. That is, a data model configured with YANG may use NETCONF to install, manipulate, and delete the configuration of network devices of network system 2. Further examples of NETCONF are described in R. Enns et al., "Network Configuration Protocol (NETCONF)," Request for Comments 6241, June 2011, Internet Engineering Task Force (IETF), the entire contents of which is incorporated by reference herein.

In some examples, each of managers 10 may developed and deployed as a plurality of microservices 19 rather than as monolithic code. A microservice is an isolated, loosely-coupled software component that implements a set of focused and distinct features or functions of an application. A microservice is often organized around a business capability and implements a "broad-stack" of software for an application. As further described herein, each microservice adheres to a well-defined Application Programming Interface (API) specified in the corresponding service definition (e.g., YANG) and may be orchestrated by invoking the API of the microservice, according to a workflow performed by the orchestrator. For example, to communicate with a microservice or between microservices, a lightweight mechanism, such as an HTTP resource API, a REST API, or the like, is used. An orchestrator component "orchestrates" the generated and implemented microservices based on rules or workflow defined for various APIs exposed by the orchestrator (via an API server) and invokable by API requests that conform to the respective API contracts. The orchestrator may handle API requests generically by following an established set of rules, or workflows, that allow a fully-customizable API contract for each external channel, whether a portal, mobile application, or API, for instance.

A network operator may use the YANG data modeling language to configure respective data models for network devices of network system 2 usable by microservices 19, 19' of central and regional managers for managing the network devices. Each of managers 10 may also include a database for storing respective data models for the microservices 19, 19'.

In some examples, microservices are executed via virtual machines. In some examples, microservices are executed via container technologies, such as Docker® or other containerized platforms, to package an application and its runtime dependencies into a single container. These containers may be managed with a container cluster manager, such as Kubernetes, to provide a platform for automating deployment, scaling, and operations of containers, for example.

The data model for a network device used by a microservice 19 of the central manager may be different than the data model for a corresponding microservice 19' of the regional managers. For example, a microservice 19' for the regional manager may maintain a per-device data model, whereas a microservice 19 for the central manager may maintain a high-level abstract data model that encompasses multiple different network devices. That is, some objects of a data model configured for the microservices may require consistency across a distributed network, whereas other objects may need to account for differences across the distributed network. Regional managers 10B-10D include microservices 19' have corresponding microservices 19 for the central manger 10A.

In accordance with techniques described in this disclosure, annotations and rules are configured for data replication and/or API call routing for microservices of a distributed network management system. Annotations may define the scope of an object across data models for microservices of the central and regional managers. For example, a network manager developer may annotate a network device data model using a set of annotations that specify the scope of various objects in the data model. That is, the set of annotations define a scope of an object for a data model for a network device to cause microservices developed using the annotated data model to replicate the data among the different central and regional managers 10 to enforce data consistency according to the defined scope for the object. The developer may also configure rules for which an API server may read and manipulate the objects of a data model based on the annotations.

In the example of FIG. 1, managers 10 may include microservice instances 19, 19' generated based on the annotations and rules described herein. For example, a developer of network managers 10 may annotate objects of a common network device data model with annotations that define a scope for the objects, such scope including in some examples, central-only annotation 18A, one-region-only annotation 18B, all-regions annotation 18C, central-and-one-region annotation 18D, and central-and-all-regions annotation 18E, to define the scope of objects or attributes across distributed network system 2. As further described herein, the developer may also configure rules by which API servers may, based on the annotations, automatically execute functions for data replication and application program interface (API) call routing to network devices in the distributed network system 2.

In one example, a developer for network managers 10 for network system 2 may define a central-only annotation 18A applied at various levels of a data model. That is, by applying the central-only annotation 18A to an object (and its attributes and methods) in the data model, the scope of the object is defined as only associating with central manager 10A. All attributes and methods of a class with the central-only annotation 18A inherit the scope of the class.

When the data model with central-only annotation 18A is processed, application code for central manager 10A may be automatically generated for compilation as a microservice 19 for central manager 10A, which makes use of the data model. Central manager 10A may execute the application code for a microservice application for central manager 10A. As such, the microservice functionality for objects with the central-only annotation 18A may exist only in central manager 10A.

The application code for an API server of central manager 10A may include rules to invoke various functions on objects with the central-only annotation 18A. For example, the rules may instruct only an API server for central manager 10A to serve create, read, update, and delete (CRUD) API calls and method API calls for objects with the central-only annotation 18A. In this way, only central manager 10A may receive and/or manipulate an object with the central-only annotation 18A.

In one example, a developer for network managers 10 for network system 2 may define a one-region-only annotation 18B applied at various levels of a data model. That is, by applying the one-region-only annotation 18B to an object (and its attributes and methods) in the data model, the scope of the object is defined as only associated with one of regional managers 10. In the example of FIG. 1, an attribute of a network device data object may identify regional manager 10C (e.g., by the regional manager name). All attributes and methods of a class with the one-region-only annotation 18B inherit the scope of the class.

When the data model with one-region-only annotation 18B is processed, application code may be generated only for regional managers 10B-10D. Regional manager 10C may execute the application code for a microservice application 19 developed using the one-region-only annotation 18B. As such, objects with the one-region-only annotation 18B may exist in only regional managers 10B-10D and only regional manager 10C may manage the network device object that is annotated in the corresponding data model with the one-region-only annotation 18B.

The application code for an API server of regional managers 10B-10D may include rules to invoke various functions on objects with the one-region-only annotation 18B. For example, the rules may instruct only an API server of regional managers 10B-10D to serve CRUD API calls and method API calls for objects with the one-region-only annotation 18B.

In one example, a developer for network managers 10 for network system 2 may define an all-regions annotation 18C applied at various levels of a data model. That is, by applying the all-regions annotation 18C to an object (and its attributes and methods) in the data model, the scope of the object is defined as associating with all of regional managers 10B-10D. All attributes and methods of a class with the all-region annotation 18C inherit the scope of the class. In some examples, an object with the all-regions annotation 18C may be overridden with a narrower scope, e.g., by applying a one-region-only annotation 18B. In some examples, an attribute of an object with the all-regions annotation 18C may identify one of the regional managers configured as a "primary" regional manager (e.g., regional manager 10C), that manages the attribute, for example.

When the data model with the all-region annotation 18C is processed, application code may be generated for microservices 19' of all regional managers 10B-10D. All of regional managers 10B-10D may compile and execute the application code for a microservice application. As such, the microservice instances 19' for objects with the all-regions annotation 18C may exist in all regional managers.

The application code may include rules for API servers of primary and non-primary regional managers to invoke various functions on objects with the all-regions annotation 18C. For example, the rules may instruct only the API server of the primary regional manager microservice to serve create, update, and/or delete API calls for attributes with the all-regions annotation 18C. In some examples, the rules may also instruct API servers of non-primary regional managers microservices to asynchronously replicate the create, update, and delete API calls for the attributes. For example, if primary regional manager 10C serves a create API call for the attribute with all-regions annotation 18C, the rules may instruct API servers for non-primary regional managers 10B, 10D to invoke a create API call to create corresponding attributes with the all-regions annotation 18C in the non-primary regional managers. Similarly, if primary regional manager 10C serves an update API call for an attribute with the all-regions annotation 18C, the rules may instruct API servers for non-primary regional managers 10B, 10D to invoke an update API call to update corresponding attributes with the all-regions annotation 18C in the non-primary regional managers. Likewise, if primary regional manager 10C serves a delete API call for an attribute with the all-regions annotation 18C, the rules may instruct the API servers for non-primary regional managers 10B, 10D to invoke a delete API call to delete corresponding attributes with the all-regions annotation 18C from the non-primary regional managers.

The rules may also instruct any API server of regional managers 10B-10D to serve a read API call such that an attribute with the all-regions annotation 18C is returned. In some examples, the rules may further instruct an API server to return the attribute with the one-region-only annotation 18B only if the primary regional manager (e.g., regional manager 10C) serves the read API call.

The developer may also configure rules for an API server of a regional manager microservice to invoke various functions on methods with an all-regions annotation 18C. For example, the rules may instruct an API server of any of regional managers 10B-10D to serve a method API call for a method with the all-regions annotation 18C, and may instruct only primary regional manager 10C to serve a method API call for a method with the one-region-only annotation 18B. In this way, an attribute with the all-regions annotation 18C is unified across all regional manager data models of the distributed system, whereas an attribute with the one-region-only 18 may remain different from other data models in the distributed system.

In one example, a developer for network managers 10 for network system 2 may define a central-and-one-region annotation 18D applied at various levels of the data model. That is, by applying the central-and-one-region annotation 18D on an object (and its attributes and methods), the scope of the object in the data model is defined as associating with central manager 10A and one of regional managers 10B-10D. In the example of FIG. 1, an object attribute for an object of the data model having the central-and-one-region annotation 18D may identify regional manager 10C (e.g., by the regional manager name). As such, regional manager 10C is the "one-region" for the central-and-one-region annotation 18D. An attribute and method of a class with the central-and-one-region annotation 18D inherits the same scope as the class. All attributes of a class with the central-and-one-region annotation 18D inherit the scope of the class. In some examples, an attribute or method with the central-and-one-region annotation 18D may be assigned a narrower scope, e.g., a central-only annotation 18A or one-region-only annotation 18B.

When the data model object with the central-and-one-region annotation 18D is processed, application code for a central manager 10A microservice and a regional manager 10C may be generated for managing the data model object. Central manager 10A and regional manager 10C may compile and execute the application code for a microservice application. As such, the microservice instances 19, 19' for objects with the central-and-one-region annotation 18C may exist in a central manager and in one regional manager.

The application code includes rules for API servers of a central and/or a regional manager to invoke operations on objects with the central-and-one-region annotation 18D (or narrower annotations). For example, the rules may instruct an API server for central manager to serve CRUD API calls and an API server of a regional manager to serve read and update API calls.

In one instance, the rules may instruct only API server of central manager to serve a create API call. If central manager 10A serves a create API call, the rules may instruct an API server of central manager 10A to pass data values for attributes with the central-and-one-region annotation 18D or central-only annotation 18A to the central manager. Moreover, a create API call for the attribute with the central-and-one-region annotation 18D is asynchronously replicated to the one-region, regional manager 10C. For example, the rules may instruct the API servers of regional managers 10B-10D to invoke a create API call to create corresponding attributes with the central-and-one-region annotation 18D. In this way, an attribute with the central-and-one-region annotation 18D are unified across the central manager data model and a single regional manager data model.

In one instance, if central manager 10A serves a read API call, the rules may instruct an API server to return an attribute with central-only annotation 18A only to central manager. If regional manager 10C serves a read API call, the rules may instruct an API server to return an attribute with one-region-only annotation 18B only to regional manager 10C.

In one instance, the rules may instruct API servers of central manager 10A and regional manager 10C to serve an update API call. If central manager 10A serves the update API call, the rules may instruct an API server of central manager 10A to update only attributes with the central-and-one-region 18D and/or central-only annotations 18A. Moreover, the updated attributes with the central-and-one-region annotation 18D are replicated to regional manager 10C. For example, if the central manager 10A serves an update API call, the rules may instruct an API server of regional manager 10C to invoke an update API call to update corresponding attributes with the central-and-one-region annotation 18D in regional manager 10C.

In one instance, the rules may instruct API server of regional manager 10C to serve an update API call. If regional manager 10C serves an update API call, the rules may instruct an API server of regional manager 10C to update only the attributes with the one-region-only annotation 18B.

In one instance, the rules may instruct only API server of central manager 10A to serve a delete API call and to asynchronously delete a corresponding attribute with the central-and-one-region annotation 18D from regional manager 10C. For example, if central manager 10A serves a delete API call, the rules may instruct an API server for regional manager 10C to invoke the delete API call to delete attributes with the central-and-one-region annotation 18D.

The rules may further instruct an API server for central manager 10A to serve a method API call for a method with the central-only annotation 18A. Regional manager 10C may automatically route a method with central-only annotation 18A to central manager 10A.

The rules may also instruct an API server for regional manager 10C to serve a method API call for a method with a one-region-only annotation 18B. Central manager 10A may automatically route a method with one-region-only annotation 18B to regional manager 10C.

In one example, a developer for network managers 10 for network system 2 may define a central-and-all-regions annotation 18E applied at various levels of the data model. That is, by applying the central-and-all-regions annotation 18E to an object (and its attributes and methods), the scope of the object in the data model is defined as associating with central manager 10A and all of regional managers 10B-10D. All attributes of a class with the central-and-all-regions annotation 18E inherit the scope of the class. In some examples, the attributes with scope central-and-all-regions may further be assigned a narrower scope of central-only 18A, all-regions 18C, and/or one-region-only 18B.

When the data model with the central-and-all-regions annotation 18E is processed, application code may be generated for microservices 19 of central manager 10A and microservices 19' for regional managers 10B-10D. Central manager 10A and all regional managers 10B-10D may execute the application code for the microservices 19. As such, the microservice instances for objects with the central-and-all-regions annotation 18E may exist in a central manager and in all regional managers.

The application code may include rules for API servers of a central and/or a regional manager to invoke operations on objects with the central-and-all-regions annotation 18E. For example, the rules may instruct an API server of central manager 10A to serve CRUD APIs, an API server of primary regional manager 10C to serve an update API call, and API servers of regional managers to serve read API calls.

In one instance, the rules may instruct only API server of central manager 10A to serve a create API call. If central manager 10A serves a create API call, the rules may instruct an API server to create attributes with a central-and-all-regions annotation 18E, central-and-one-region annotation 18D, or central-only annotation 18A in the central manager. The rules may also instruct API servers of regional managers to replicate the created attribute in all regional managers. For example, the rules instruct respective API servers of the regional managers to invoke a create API call to create the attribute with central-and-all-regions 18E in the corresponding regional managers. An API server for primary regional manager 10C may also invoke a create API call to create the attribute with central-and-one-region 18D in the primary regional manager.

In one instance, the rules may instruct API servers of central manager 10A and regional managers 10B-10D to serve read API calls. If central manager 10A serves a read API call, the rules may instruct an API server to return an attribute with the central-and-all-regions annotation 18E and/or central-only annotation 18A to central manager 10A. If a regional manager serves a read API call, the rules may instruct an API server to return attributes with one-region-only annotation 18B only to the primary regional manager (e.g., regional manager 10C). If the regional manager serves a read API call, the rules may instruct an API server to return the attributes with the central-and-all-regions annotation and all-regions annotation to the regional managers.

In one instance, the rules may instruct API servers of central manager 10A and primary regional manager 10C to serve an update API call. If the API server of central manager 10A serves the update API call, the rules may instruct only attributes with central-only annotation 18A, central-and-one-region annotation 18D, and/or central-and-all-regions annotation 18E are updated. The rules may also replicate the update to regional managers. For example, if central manager 10A updates the attribute with the central-and-one-region annotation 18D, the rules may also instruct an API server for the primary regional manager (e.g., regional manager 10C) to invoke an update API call to update a corresponding attribute with the central-and-one-region annotation 18D in the primary regional manager. If central manager 10A updates the attribute with the central-and-all-regions annotation 18E, the rules may also instruct an API server for all regional managers to invoke an update API call to update a corresponding attribute with the central-and-all-regions annotation 18E in the regional managers.

If primary regional manager 10C serves an update API call, the rules may instruct only attributes with all-regions annotation 18C and/or one-region-only annotation 18B are updated. The rules may also replicate the update for an attribute with the all-regions annotation 18C to all regional managers. For example, if primary regional manager 10C updates the attribute with the all-regions annotation 18C, the rules may also instruct API servers for the non-primary regional managers to invoke an update API call to update a corresponding attribute with the all-regions annotation 18D in the non-primary regional managers. The rules may further instruct non-primary regional managers to forward update API calls to the primary regional manager.

In one instance, the rules instruct only an API server of central manager 10A to serve a delete API call. If central manager 10A serves the delete API call, the rules may instruct an asynchronous deletion from all regional managers. For example, the rules may instruct API servers of regional managers 10B-10D to invoke a delete API call for attributes with central-and-all-regions annotation 18E to delete the attribute from the regional managers.

In some examples, the developer of managers 10 of network management system 2 may use consistency level annotations for an object. For example, the developer may specify a strong-consistency annotation such that updates to attributes with this level are done atomically at all locations (e.g., central and regional managers) where the object is present. That is, create API calls and delete API calls of objects with the strong-consistency annotation are done atomically at all locations where the object is present.

In another example, the developer of network management system 2 may use an eventual-consistency annotation for an object. For example, the network operator may specify an eventual-consistency annotation such that updates to attributes with this level are done at one location and replicated asynchronously to all other locations where the object is present. That is, create API calls and delete API calls of objects with the eventual-consistency annotation are performed at one location and replicated eventually to all other locations where the object is present.

In this way, the annotations and rules described herein provide a unified data model for microservices across a distributed system. Based on the scope and consistency annotations, application code is generated for managers 10 to perform data replication, and based on the scope annotation, application code is generated for managers 10 to perform call forwarding/routing.

Figure 2:
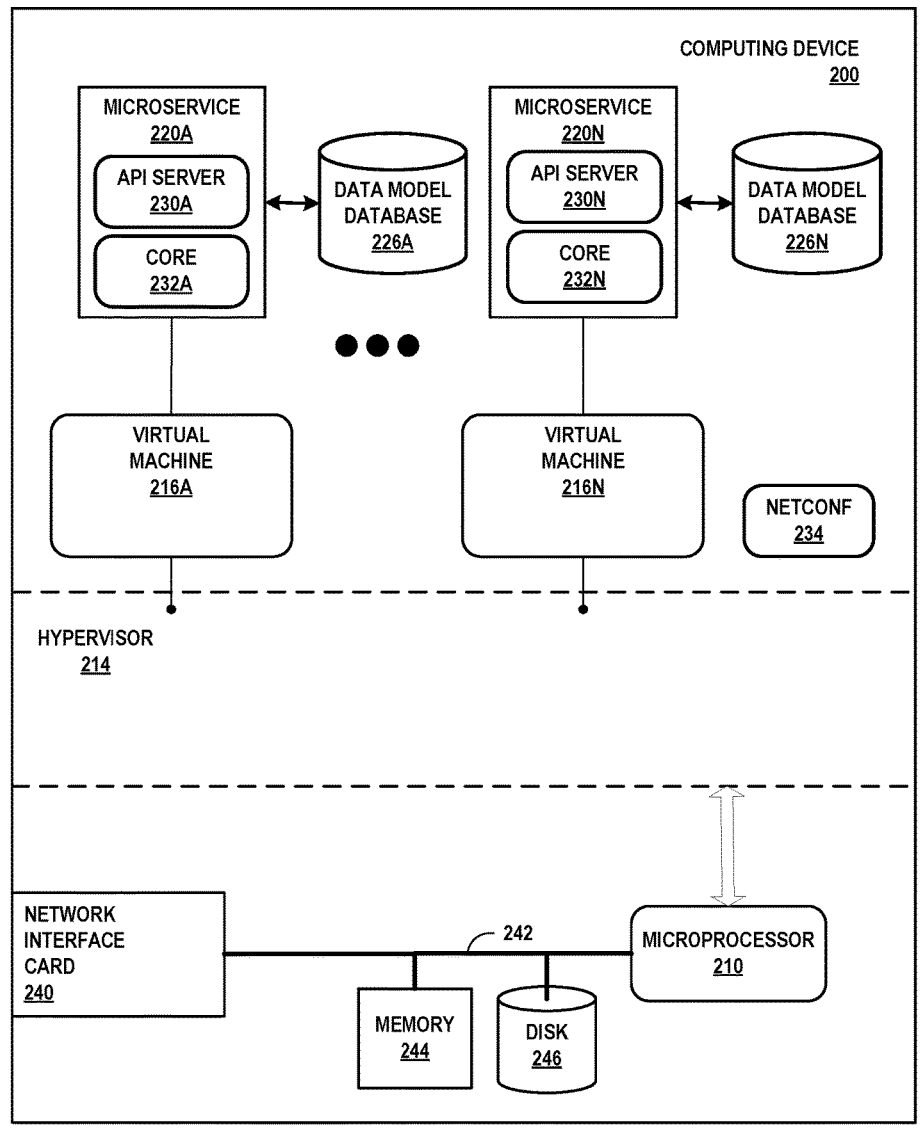
FIG. 2 is a block diagram illustrating an example manager in further detail, in accordance with the techniques of this disclosure.

FIG. 2 is a block diagram illustrating an example computing device that executes one or more microservice instances for a manager, developed and deployed according to techniques described in this disclosure. Computing device 200 may represent a real or virtual server and may represent any of managers 10 in FIG. 1.

Computing device 200 may include a system bus 242 coupling hardware components of a computing device 200 hardware environment. System bus 242 couples memory 244, network interface card (NIC) 240, storage disk 246, and microprocessor 210. Network interface card 240 includes one or more interfaces configured to exchange packets using links of an underlying physical network. Microprocessor 210 may include one or more processors each including an independent execution unit to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 244, NIC 240, storage disk 246, and microprocessor 210 provide an operating environment for a software stack that executes a hypervisor 214 and one or more virtual machines 216A-216N (collectively, "virtual machines 216"). While illustrated and described with respect to virtual machines, microservice instances 220A-220N may be executed by other operating environments, such as containers (e.g., a DOCKER container). An operating system kernel (not shown in FIG. 2) may execute in kernel space and may include, for example, a Linux, Berkeley Software Distribution (BSD), another Unix-variant kernel, or a Windows server operating system kernel, available from Microsoft Corp.

Computing device 200 executes a hypervisor 214 to manage virtual machines 216. Example hypervisors include Kernel-based Virtual Machine (KVM) for the Linux kernel, Xen, ESXi available from VMware, Windows Hyper-V available from Microsoft, and other open-source and proprietary hypervisors.

Virtual machines 216 execute one or more microservices instances 220A-220N (collectively, "microservices instances 220"). Each of virtual machines 216 may include a corresponding microservice API server 230A-230N (collectively, "API servers 230") to invoke API calls on microservices instances 220 and enforce consistency defined for object of a data model among multiple managers of a distributed network management system, and a corresponding microservice core 232A-232N (collectively, "microservice cores 232") to implement business logic with respect to the microservice.

Each of microservices instances 220 may represent an example instance of a microservice executed by any of managers 10 of FIG. 1. In some examples, a virtual machine 216 may host one or more microservices instances 220. A microservice instance may include compiled and executed application code that comprises at least part of a microservices application.

Computing device 200 may also include a data model database 226A-226N (collectively, "data model database 226") for storing records associated with the data models described in FIG. 1. When executed, microservices instances 220 may manage the data model database 226. Although each microservice 220 is illustrated with a corresponding data model database 226, data model database 26 may be a central database for storing all data model records for microservices 220 for the manager that includes the data model database. Although only one computing device 200 is illustrated, a manager may be scaled to execute multiple instances of a microservice across multiple computing devices.

Microservice instances 220 are described hereinafter with respect to microservice instance 220A. API server 230A may apply rules or workflows defined for various APIs exposed by API server 230A and invokable by API requests that conform to the respective API contracts. As described in FIG. 1, an API server of virtual machine 216A may invoke API calls to microservice instance 220A based on scope and consistency annotations. An API server 230A and core 232A for a microservice may execute by different virtual machines of one or more computing devices.

In the example of FIG. 2, network protocols may include the NETCONF protocol 234, to install, manipulate, and delete the configuration of network devices.

In accordance with techniques described in this disclosure, API servers 230 may invoke API calls to corresponding microservices based on annotations configured in the data model. The annotations may be used to generate code for intelligent data replication and call forwarding/routing. API servers 230 may execute compiled versions of the generated code to cause computing device 200 to automatically execute functions to replicate data associated with an object that exists in a plurality of network managers.

Figure 3:
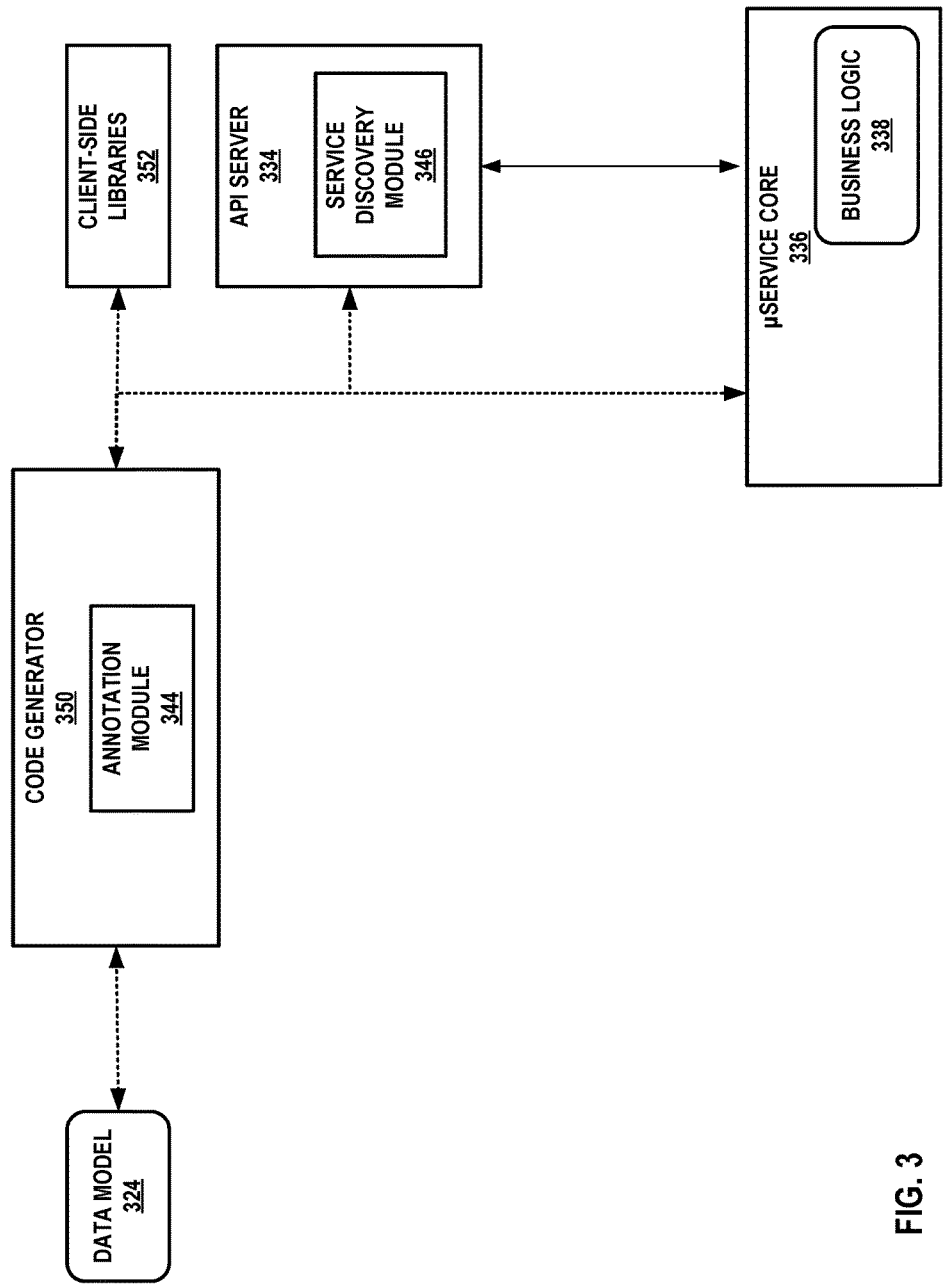
FIG. 3 is a block diagram illustrating an example of a system for generating application code for a microservice application, in accordance with the techniques of this disclosure.

FIG. 3 is a block diagram illustrating an example of a system for generating application code for a microservice application, in accordance with the techniques of this disclosure. In the example of FIG. 3, data model data 324 may include a data model definition for a microservice configured with a data modeling language (e.g., YANG). Data model data 324 may also include one or more annotations defining the scope of an object in the data model. Code generator 350 may process (e.g., run) the data model data 324 to generate application code for a microservice application instance and may examine annotations in the data model data 24 with annotations module 344 to determine the scope of objects in the microservice instance. For example, annotations module 344 may identify annotations including, central-only, one-region-only, all-regions, central-and-one-region, and central-and-all-regions, as described in FIG. 1.

Based on the identified annotation, code generator 350 may generate application code for a network manager (e.g., managers 10 of FIG. 1) for managing instances of the network device. For example, application code, when compiled and executed by the network manager, may cause the network manager to replicate data associated with an object in a data model for the network device to one or more of the network managers of a distributed system. The application code may cause API server 334 to invoke CRUD APIs for objects associated with the annotation. In some examples, code generator 350 may generate client-side code that may include client-side libraries 352 (e.g., Python, Java) that include the semantics of the annotation and its behavior. That is, a server device may use the generated client-side libraries 352 to call APIs for a corresponding object for a microservice on the client device.

As one example, annotation module 344 of code generator 350 may detect a central-and-one-region annotation for a data model class. As described in FIG. 1, each instance of this class exists in central manager 10A and in a single regional manager 10C. Based on the central-and-one-region annotation, code generator 350 may generate CRUD APIs, e.g., an update API, and may generate server-side code for an API server of central manager 10A to invoke a APIs for manipulating the object in central manager 10A and regional managers 10B-10D.

Moreover, service discovery module 346 of microservice core 336 of central manager 10A may determine the corresponding microservice, e.g., the microservice for regional manager 10C, for which microservice API server 334 of central manager 10A may invoke API calls to the API server of the corresponding microservice of regional manager 10C. To invoke APIs for another manager (e.g., regional manager 10C), API server 334 of may call APIs for another microservice of the other manager using HTTP/REST or a remote procedure call (RPC) mechanism. For example, service discovery module 346 may identify regional manager 10C from an attribute of an object that names regional manager 10C. Service discovery module 346 may, in some examples, use client-side discovery to determine network locations of available microservice instances for the other managers relevant to the scope annotation for the object. The service discovery module 346 may query a service registry that includes one or more entries for registered microservice instances for the other relevant managers. Service discovery module 346 may, in some examples, use service-side discovery whereby API server 334 queries a load balancer that queries the service registry and routes API requests to an available microservice instance.

Figure 4:
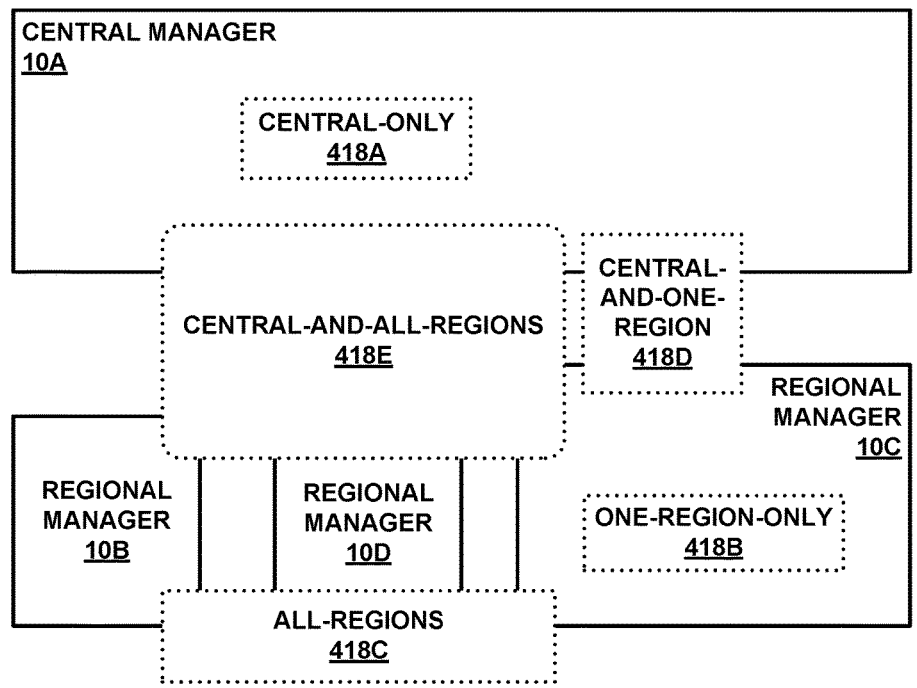
FIG. 4 is a block diagram illustrating example annotations, in accordance with the techniques of this disclosure.

FIG. 4 is a block diagram illustrating an example scope for annotations, in accordance with the techniques of this disclosure. Annotations 418A-418E may illustrate the scope of an object in a data model. That is, the annotations define the location of an object in the distributed network. For example, an object of a data model with a central-only annotation 418A is defined as existing only in central manager 10A. An object with a one-region-only annotation 418B is defined as existing only in regional manager 10C. An object with an all-regions annotation 418C is defined as existing in all regional managers 10B-10D. An object with a central-and-one-region annotation 418D is defined as existing only in central manager 10A and regional manager 10C. An object with a central-and-all-regions annotation 418E is defined as existing in central manager 10A and all regional managers 10B-10D.

Figure 5:
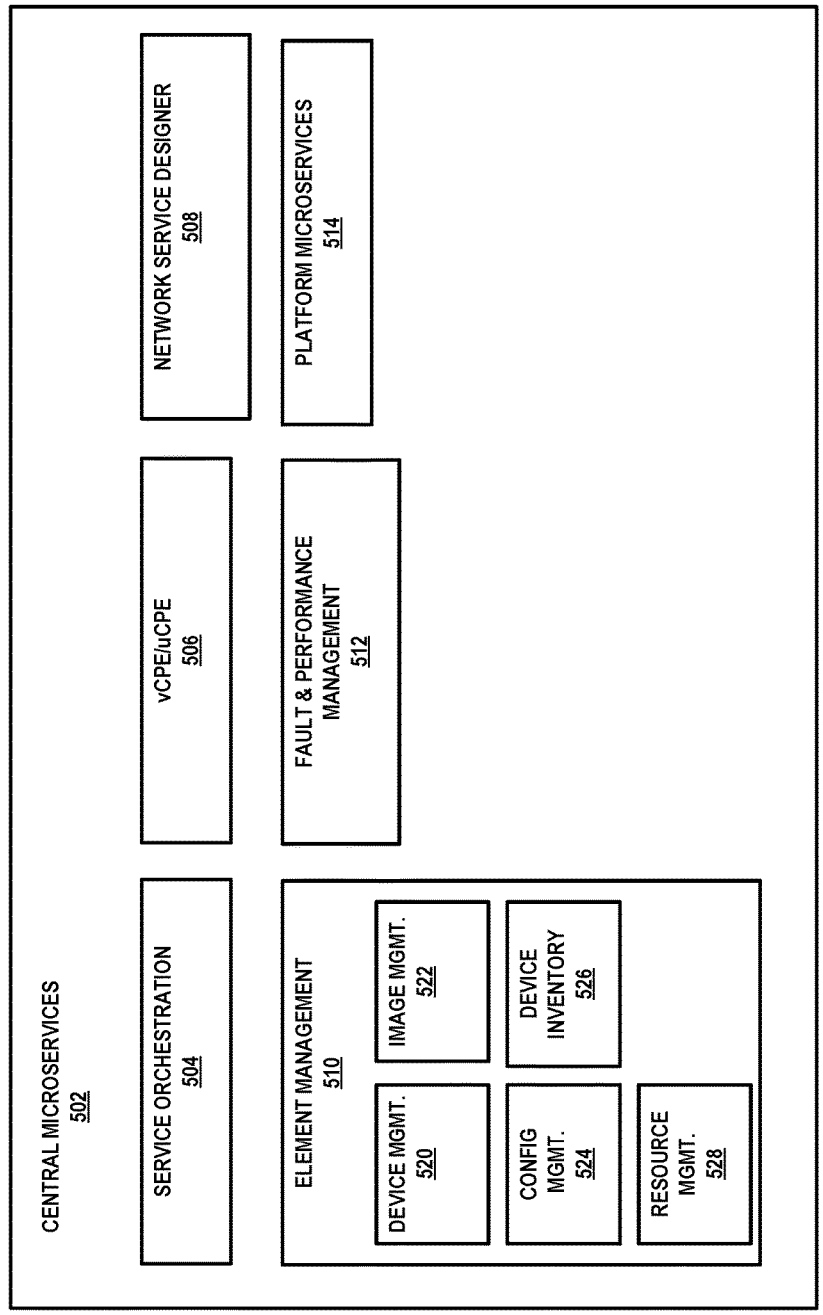
FIG. 5 is a block diagram illustrating an example of a microservice for a central manager, in accordance with the techniques of this disclosure.

FIG. 5 is a block diagram illustrating example central microservices 502 for a central manager of a distributed network management system, in accordance with the techniques of this disclosure. In the example of FIG. 5, central microservices 502 may illustrate an example instance of microservices of central manager 10A of FIG. 1 and computing device 200 of FIG. 2. As described above, each of the microservices in central microservices 502 is an isolated, loosely-coupled software component that implements a set of focused and distinct features or functions of the software. In the example of FIG. 5, central microservices 502 may have various microservices including service orchestration microservices 504, virtual customer premises equipment (vCPE)/universal customer premises equipment (uCPE) microservices 506, Network Service Designer microservices 508, Element Management microservices 510, Fault and Performance Management microservices 512, and Platform microservices 514.

In one example, element management microservices 510 may represent the behavior and functions of a management system to provide management of network devices of the system. For example, the management functions may include microservices for device management 520 ("DEVICE 520"), image management 522 ("IMAGE MGMT. 522"), configuration management 524 ("CONFIG MGMT. 524"), device inventory 526 ("DEVICE INVENTORY 526"), and resource management 528 ("RESOURCE MGMT. 528").

In some examples, the device management 520, image management 522, configuration management 524, and device inventory 526 microservices may include objects that exist in both a central and a regional manager (as described in FIG. 6), whereas the resource management 528 microservice may exist only in the central manager. Microservices may be developed using data models (as further described in FIG. 7), with objects representing attributes or methods associated with the microservices.

In accordance with the techniques of this disclosure, annotations may be specified for the objects of data models configured for central microservices 502 to identify the scope of an object. Using the example from above, the device management 520 microservice is developed using a data model with various attributes and methods. As described above, objects associated with the device management 520 microservice may exist in a central manager and a single regional manager. A network operator may apply a central-and-one-region annotation for attributes in a data model configured for the device management 520 microservice. Objects associated with the resource management 528 microservice may exist only in central manager. A network operator may apply a central-only annotation for attributes in a data model configured for the resource management 528 microservice. Based on these annotations, a code generator may generate application code such that the network managers with affected microservices may invoke CRUD APIs and method APIs to maintain data consistency across the distributed network.

Figure 6:
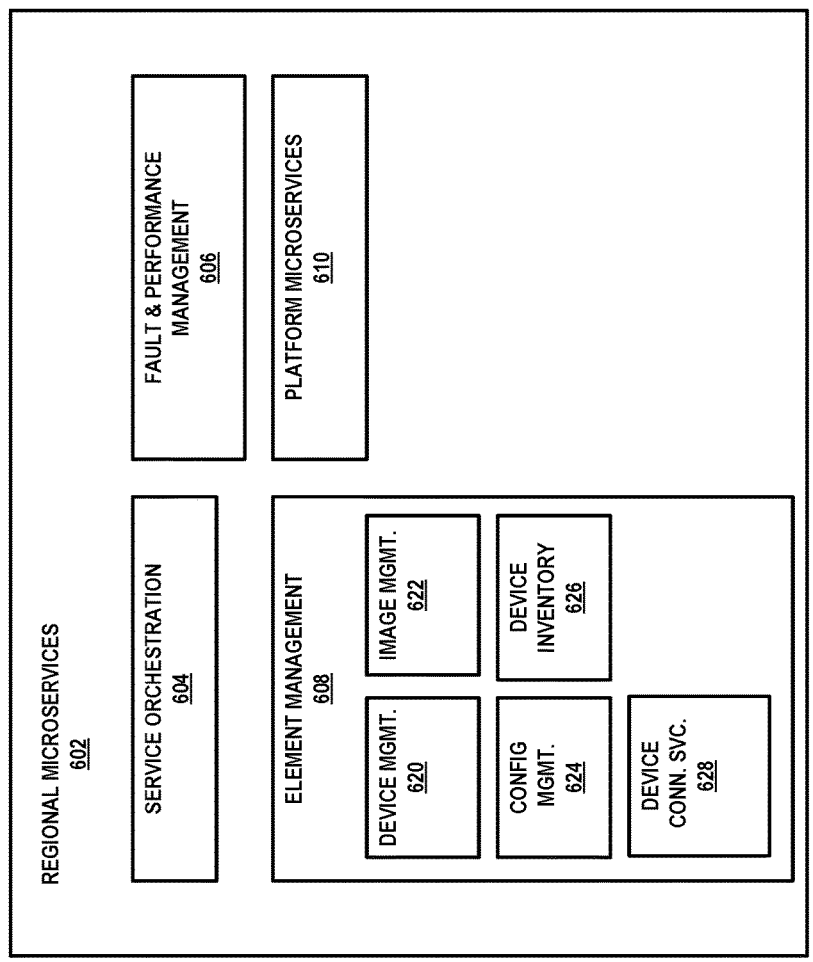
FIG. 6 is a block diagram illustrating an example of a microservice for a regional manager, in accordance with the techniques of this disclosure.

FIG. 6 is a block diagram illustrating example regional microservices 602 for a regional manager of a distributed network management system, in accordance with the techniques of this disclosure. In the example of FIG. 6, regional microservices 602 may illustrate an example microservices of one of regional managers 10B-10D of FIG. 1. As described above, each of the microservices in regional microservices 602 is an isolated, loosely-coupled software component that implements a set of focused and distinct features or functions of the software. In the example of FIG. 6, regional microservices 602 may have various microservices including service orchestration microservices 604, Fault and Performance Management microservices 606, Element Management microservices 608, and Platform microservices 610.

Element management microservices 610 may represent the behavior and functions of a management system to provide management of network devices of the system. For example, the management functions may include microservices for device management 620 ("DEVICE MGMT. 620"), image management 622 ("IMAGE MGMT. 622"), configuration management (CONFIG MGMT. 624"), device inventory 626 ("DEVICE INVENTORY 626"), and device connection services 628 ("DEVICE CONN. SVC. 628").

In some examples, the device management 620, image management 622, configuration management 624, and device inventory 626 microservices may exist in both a central manager and a regional manager but may differ according to annotations specified for the unified data mode for the microservices, whereas the device connection services 628 microservice may exist only in the regional manager. The microservices may be developed using data models (as further described in FIG. 7) with objects representing attributes or methods associated with managing network devices.

In accordance with the techniques of this disclosure, annotations are specified for regional microservices 602 to identify the scope of data model objects. Using the example from above, the device management 620 microservice may exist in a central manager and a single regional manager. A developer may apply a central-and-one-region annotation for attributes in a data model configured for the device management 620 microservice. Objects associated with the device connection services 628 microservice may exist only in the regional manager. A developer may apply a one-region-only annotation for attributes in a data model configured for the device connection services 628 microservice. Based on these annotations, a code generator may generate application code such that the network managers with affected microservices may invoke CRUD APIs and method APIs to maintain data consistency across the distributed network.

Figure 7:
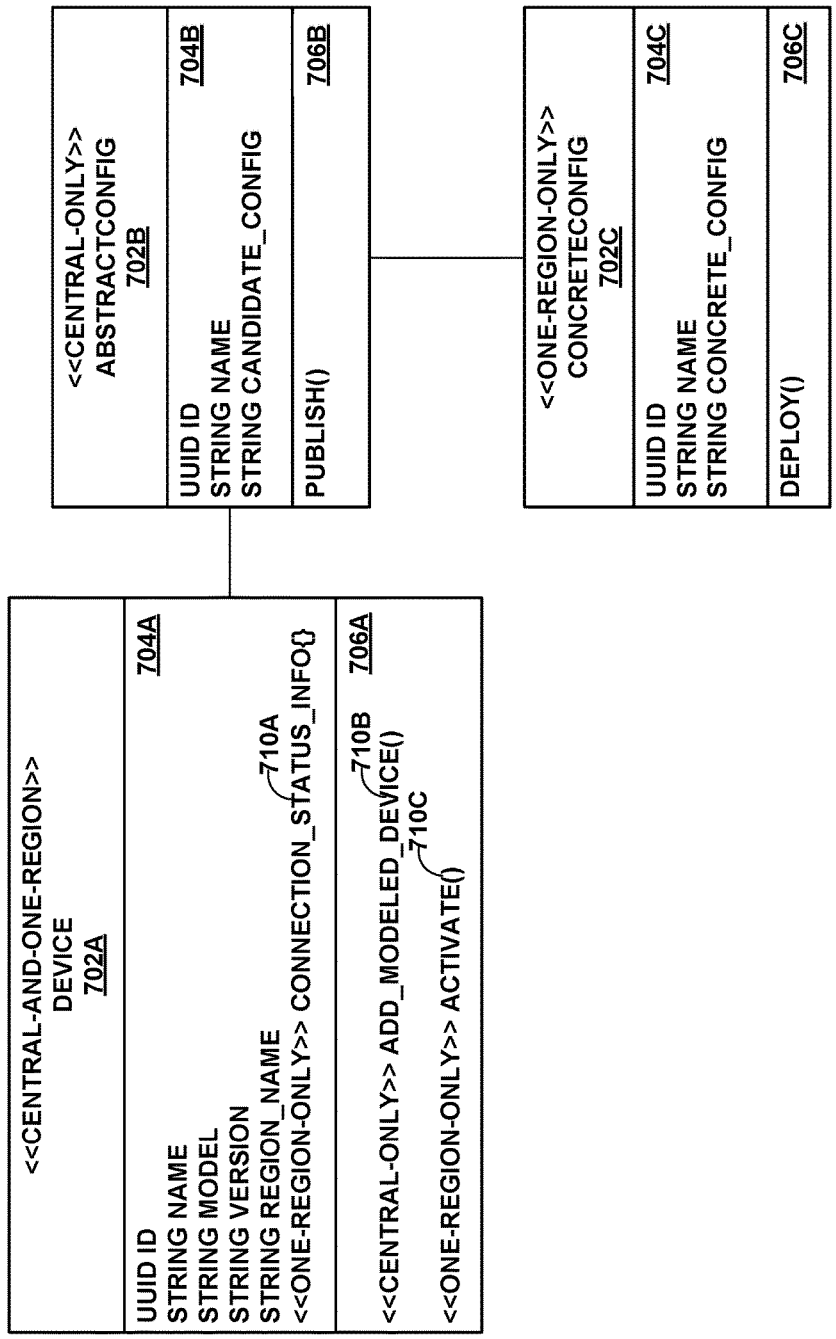
FIG. 7 is a block diagram illustrating an example implementation of a data model with annotations, in accordance with the techniques of this disclosure.

FIG. 7 is a block diagram illustrating an example data model with annotations, in accordance with the techniques of this disclosure. The example of FIG. 7 may illustrate example data models configured for network devices managed by central and regional microservices. Developers of a network management system may use a data modeling language, e.g., YANG, to configure the data models of FIG. 7. In this example, various annotations, which are indicated using a <<annotation>> notation, are applied to objects in the data models to define the scope of the objects (along with its attributes and methods) in the distributed system. For example, a central-and-one-region annotation is applied to a device class ("DEVICE") 702A; a central-only annotation is applied to the abstract configuration class ("ABSTRACT-CONFIG") 702B; and a one-region-only annotation is applied to a concrete configuration class ("CONCRETE-CONFIG") 702C.

The DEVICE class 702A may have attributes 704A that inherit the scope of the central-and-one-region annotation. For example, attributes 704A may include a device unique identifier ("ID"), device name ("NAME"), device model ("MODEL"), device version ("VERSION"), and device region ("REGION_NAME") that inherits the central-and-one-region annotation from DEVICE class 702A. That is, attributes 704A are associated with the central manager and one regional manager.

DEVICE class 702A may also include a method for accessing a device connection status ("CONNECTION_STATUS_INFO{ }") 710A configured with a narrower one-region-only such that only one regional manager may serve the method. DEVICE class 702A may also include a method for adding a device to central manager ("ADD_MODELED_DEVICE( )") 710B configured with a narrower central-only annotation such that only central manager may serve the method. DEVICE class 702A may also include a method for activating a network device ("ACTIVATE( )") 710C configured with a narrower one-region-only annotation such that only one regional manager may serve the method.

ABSTRACTCONFIG class 702B may include attributes 704B that inherit the scope of the central-only annotation. For example, attributes 704B may include a device unique identifier ("ID"), device name ("NAME"), and candidate configuration ("CANDIDATE_CONFIG") that inherits the central-only annotation from ABSTRACTCONFIG class 702B. That is, attributes 704B are associated with only the central manager.

ABSTRACTCONFIG class 702B may also include a publish method ("PUBLISH ( )") 706B with a central-only annotation such that only central manager may serve the method.

CONCRETE CONFIG class 702C may include attributes 704C that inherit the scope of the one-region-only annotation. For example, attributes 704C may include a device unique identifier ("ID"), device name ("NAME"), and concrete configuration ("CONCRETE_CONFIG") that inherits the one-region-only annotation from CONCRETECONFIG class 702C. That is, attributes 704C are associated only with one regional manager.

CONCRETECONFIG class 702C may also include a deploy method ("DEPLOY( )") 706C with a one-region-only annotation such that only one regional manager may serve the method.

In operation, code generators may process data models 702A-702C to generate application code for central and regional managers 10 based on annotations. For example, a code generator may run the above data models and may identify, with an annotation module, annotations of objects in the data models. The annotation module may determine that attributes 704A (e.g., ID, NAME, MODEL, VERSION, REGION_NAME) of DEVICE class 702A include a central-and-one-region annotation and are associated with a central manager and one regional manager.

Based on the above annotation, the code generator may generate application code for a microservice application for central manager and a regional manager. For example, the code generator may generate server-side code for an API server of central manager to invoke a create API to create a microservice instance with a NAME object. Because the annotation for the NAME attribute is central-and-one-region, the application code may further instruct central manager to asynchronously replicate the NAME attribute to the one regional manager. For example, a service discovery module for the central manager may identify the regional manager from the central-and-one-region annotation. Central manager may call the regional manager and invoke a create API call in the regional manager to replicate data associated with the NAME attribute in the regional manager.

FIG. 8A is a flowchart illustrating an example mode of operation for a development platform to generate and compile microservices based on annotations specified for a data model for network devices of a distributed network management system, in accordance with the techniques of this disclosure. In the example of FIG. 8, a code generator may receive a data model comprising an object and an annotation that indicates a type of scope for an object (802). As described above, a developer may configure a data model for a microservice of a network manager in the distributed system. In some examples, network operator may use the YANG data modeling language to configure the data model. The network operator may apply annotations to various objects in the data model such that the annotations may specify the location of the objects (along with its attributes and methods) in the distributed system. In some examples, annotations may include central-only, one-region-only, all-regions, central-and-one-region, and central-and-all-regions.

Code generator may process, based at least on the object and annotation, the data model to generate application code for a microservice application for a network manager for managing instances of the network device (804). In some examples, the data model may be a .yaml configuration file. The code generator is configured to identify an annotation in the data model to determine the scope of the object. Based on the identified annotation, the code generator may generate application code including server-side and client-side code to be executed by API servers of network managers in the distributed network managed system.

The developer may compile the application code to generate at least a part of a microservice application (806). For example, the compiled code may include instructions for an API server of the network manager to invoke API calls based on the annotations and objects.

FIG. 8B is a flowchart illustrating an example mode of operation for a network manager microservice to enforce data consistency among multiple network managers that manage a network device modeled by a data model having an object with a specified scope and consistency level, according to techniques of this disclosure. The network manager may execute the microservice application (808). The microservice API server may receive a request to apply a CRUD operation with respect to an instance of an object of a network device data model (810). The microservice API server may apply the requested CRUD operation and further enforce consistency for the object instance by replicating data associated with the object to one or more of a plurality of network managers of the distributed network managed system. As described above, an API server may discovery corresponding microservices for another network manager indicated by the scope specified by the annotation for the object (812). For example, the API server may identify an identification or name of a region from an attribute of the microservice instance, and may use a service discovery infrastructure service to locate the URL for the corresponding microservices in the identified region. The API server may then invoke API calls for the corresponding microservices.

Figure 9:
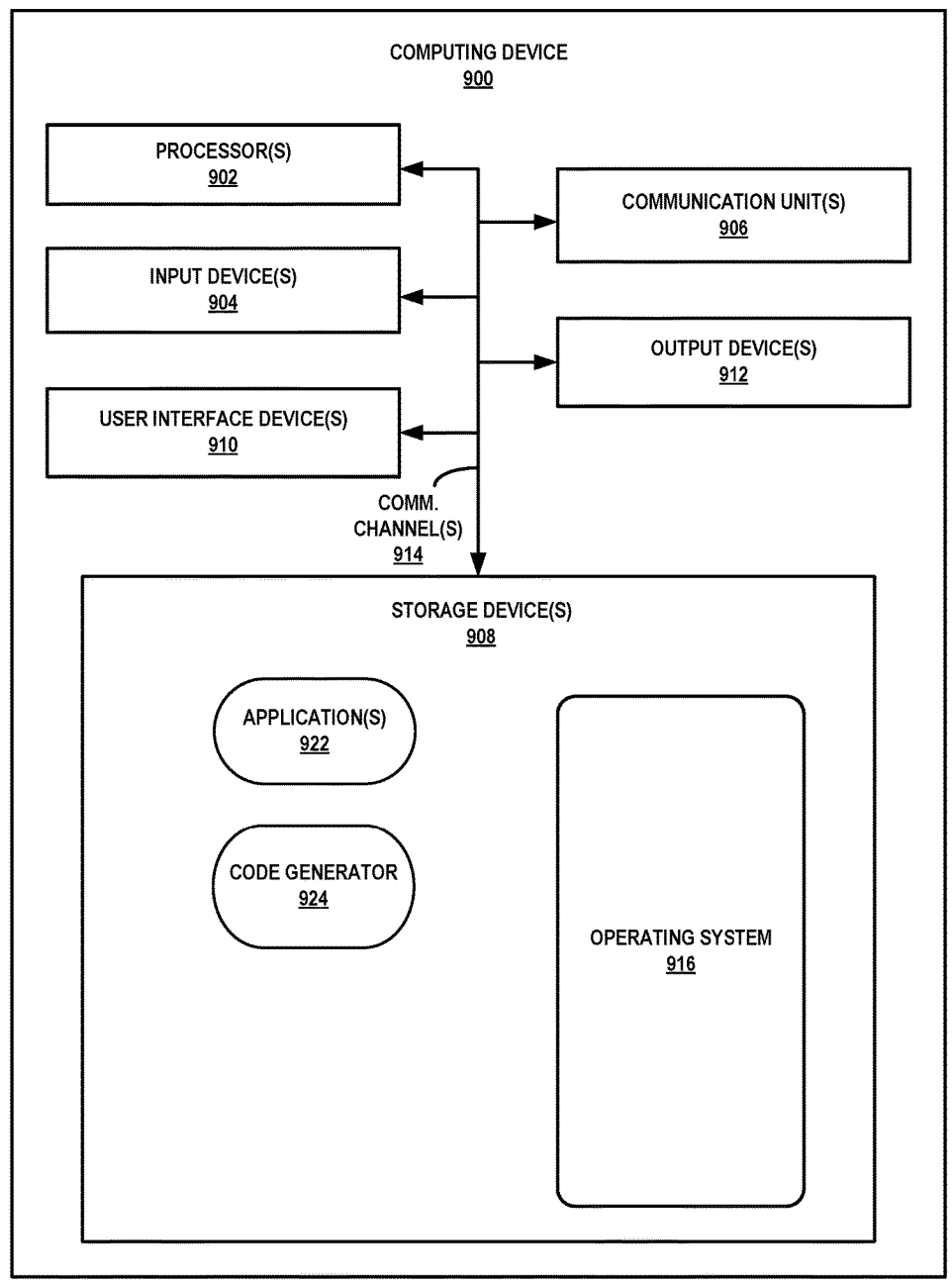
FIG. 9 is a block diagram illustrating an example computing device, in accordance with the techniques of this disclosure.

FIG. 9 is a block diagram illustrating further details of one example of a computing device that operates in accordance with one or more techniques of the present disclosure. FIG. 9 may illustrate a particular example of a server or other computing device 900 that includes one or more processor(s) 902 for executing a code generator described herein for automatically generating microservice code based on annotations applied to a unified data model. Other examples of computing device 900 may be used in other instances. Although shown in FIG. 9 as a stand-alone computing device 900 for purposes of example, a computing device may be any component or system that includes one or more processors or other suitable computing environment for executing software instructions and, for example, need not necessarily include one or more elements shown in FIG. 9 (e.g., communication units 906; and in some examples components such as storage device(s) 908 may not be co-located or in the same chassis as other components).

As shown in the specific example of FIG. 9, computing device 900 includes one or more processors 902, one or more input devices 904, one or more communication units 906, one or more output devices 912, one or more storage devices 908, and user interface (UI) device 910, and communication unit 906. Computing device 900, in one example, further includes one or more applications 922, code generator applications 924, and operating system 916 that are executable by computing device 900. Each of components 902, 904, 906, 908, 910, and 912 are coupled (physically, communicatively, and/or operatively) for inter-component communications. In some examples, communication channels 914 may include a system bus, a network connection, an inter-process communication data structure, or any other method for communicating data. As one example, components 902, 904, 906, 908, 910, and 912 may be coupled by one or more communication channels 914. Code generator application(s) 924 may correspond to code generator 350 of FIG. 3, for example.

Processors 902, in one example, are configured to implement functionality and/or process instructions for execution within computing device 900. For example, processors 902 may be capable of processing instructions stored in storage device 908. Examples of processors 902 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 908 may be configured to store information within computing device 900 during operation. Storage device 908, in some examples, is described as a computer-readable storage medium. In some examples, storage device 908 is a temporary memory, meaning that a primary purpose of storage device 908 is not long-term storage. Storage device 908, in some examples, is described as a volatile memory, meaning that storage device 908 does not maintain stored contents when the computer is turned off. Examples of volatile memories include random access memories (RAM), dynamic random access memories (DRAM), static random access memories (SRAM), and other forms of volatile memories known in the art. In some examples, storage device 908 is used to store program instructions for execution by processors 902. Storage device 908, in one example, is used by software or applications running on computing device 900 to temporarily store information during program execution.

Storage devices 908, in some examples, also include one or more computer-readable storage media. Storage devices 908 may be configured to store larger amounts of information than volatile memory. Storage devices 908 may further be configured for long-term storage of information. In some examples, storage devices 908 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 900, in some examples, also includes one or more communication units 906. Computing device 900, in one example, utilizes communication units 906 to communicate with external devices via one or more networks, such as one or more wired/wireless/mobile networks. Communication units 906 may include a network interface card, such as an Ethernet card, an optical transceiver, a radio frequency transceiver, or any other type of device that can send and receive information. In some examples, computing device 900 uses communication unit 906 to communicate with an external device.

Computing device 900, in one example, also includes one or more user interface devices 910. User interface devices 910, in some examples, are configured to receive input from a user through tactile, audio, or video feedback. Examples of user interface devices(s) 910 include a presence-sensitive display, a mouse, a keyboard, a voice responsive system, video camera, microphone or any other type of device for detecting a command from a user. In some examples, a presence-sensitive display includes a touch-sensitive screen.

One or more output devices 912 may also be included in computing device 900. Output device 912, in some examples, is configured to provide output to a user using tactile, audio, or video stimuli. Output device 912, in one example, includes a presence-sensitive display, a sound card, a video graphics adapter card, or any other type of device for converting a signal into an appropriate form understandable to humans or machines. Additional examples of output device 912 include a speaker, a cathode ray tube (CRT) monitor, a liquid crystal display (LCD), or any other type of device that can generate intelligible output to a user.

Computing device 900 may include operating system 916. Operating system 916, in some examples, controls the operation of components of computing device 900. For example, operating system 916, in one example, facilitates the communication of one or more applications 922 and programmable network platform application(s) 924 with processors 902, communication unit 906, storage device 908, input device 904, user interface devices 910, and output device 912.

Application 922 and code generator application(s) 924 may also include program instructions and/or data that are executable by computing device 900. Example code generator application(s) 924 executable by computing device 900 may include an annotation module 926 illustrated with dashed lines to indicate that this may or may not be executable by any given example of computing device 900.

Code generator 924 may include instructions for causing computing device 900 to perform one or more of the operations and actions described in the present disclosure with respect to generating application code for a microservice to perform data replication based on a consistency annotation and scope annotation, and call forwarding/routing based on the scope annotation. As one example, code generator 924 may include instructions that cause computing device 900 to generate an application code for a microservice application for a network manager such that when compiled, and thereafter executed by the network manager, the compiled microservice may replicate data associated with an object of a data model to one or more of a plurality of network managers of a distributed network managed network system.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a computing device, a data model for a network device, wherein the data model comprises an object and an annotation that indicates a type of scope for the object; and
   processing, by the computing device based at least on the object and annotation, the data model to generate application code for a microservice application for a network manager for managing instances of the network device, wherein the application code, when compiled, and executed by the network manager, causes the network manager to replicate data associated with the object to one or more of a plurality of network managers of a distributed network management system for managing a network that includes at least one instance of the network device.

2. The method of claim 1, wherein the annotation comprises at least one of an all-regions annotation, a central-and-one-region annotation, and a central-and-all-regions annotation.

3. The method of claim 1, wherein the annotation comprises at least one of a strong-consistency annotation and an eventual-consistency annotation.

4. The method of claim 1, wherein processing the data model to generate application code comprises generating server-side code that causes the network manager to invoke one or more application programming interface (API) calls including at least one of a create API, a read API, an update API, and a delete API for the data model.

5. The method of claim 1, wherein processing the data model to generate application code comprises generating a client-side library that causes the network manager to invoke a method API on one or more of the plurality of network managers.

6. A method comprising:
receiving, by a microservice of a first network manager of a plurality of network managers of a distributed network management system for managing a network that includes at least one instance of a network device, a request for an object of a data model for the network device and stored by the first network manager, wherein the data model comprises the object and an annotation that indicates a type of scope for the object;
applying, by the microservice, an operation indicated by the request to the object;
replicating, by the microservice based at least in part on instructions generated based on the annotation, data associated with the object to a second network manager of the plurality of network managers to cause the second network manager to apply the operation to an object stored by the second network manager.

7. The method of claim 6, wherein replicating data associated with the object comprises:
determining, by the first network manager and based on an attribute of the instance of the network device, a corresponding microservice application of the second network manager; and
invoking, by the first network manager, one or more application programming interface (API) calls for the corresponding microservice application.

8. The method of claim 6, wherein replicating data associated with the object comprises:
if the annotation comprises the strong-consistency annotation, atomically replicating, by the first network manager, data associated with the object to the second network manager.

9. The method of claim 6, wherein replicating data associated with the object comprises:
if the annotation comprises the eventual-consistency annotation, asynchronously replicating, by the first network manager, data associated with the object to the second network manager.

10. The method of claim 6, wherein the request comprises an HyperText Transfer Protocol (HTTP) request.

11. The method of claim 6, wherein the request comprises a request to one of create, read, update, and delete the object.

12. A computing device comprising:
one or more hardware-based processors, implemented using discrete logic circuitry, configured to:
receive a data model for a network device, wherein the data model comprises an object and an annotation that indicates a type of scope for the object; and
process, based at least on the object and annotation, the data model to generate application code for a microservice application for a network manager for managing instances of the network device, wherein the application code, when compiled, and executed by the network manager, causes the network manager to replicate data associated with the object to one or more of a plurality of network managers of a distributed network management system for managing a network that includes at least one instance of the network device.

13. The computing device of claim 12, wherein the annotation comprises at least one of a central-only annotation, a one-region-only annotation, an all-regions annotation, a central-and-one-region annotation, and a central-and-all-regions annotation.

14. The computing device of claim 12, wherein the annotation comprises at least one of a strong-consistency annotation and an eventual-consistency annotation.

15. The computing device of claim 12, wherein, to process the data model to generate application code, the one or more hardware-based processors are configured to:
generate a server-side code that causes the network manager to invoke one or more application programming interface (API) calls including at least one of a create API, a read API, an update API, and a delete API for the data model.

16. The computing device of claim 12, wherein, to process the data model to generate application code, the one or more hardware-based processors are configured to:
generate a client-side library that causes the network manager to invoke a method API on one or more of the plurality of network managers.

17. A computing device comprising a first network manager, the computing device comprising:
one or more hardware-based processors, implemented using discrete logic circuitry, configured to:
receive, by a microservice of the first network manager of a plurality of network managers of a distributed network management system for managing a network that includes at least one instance of a network device, a request for an object of a data model for the network device and stored by the first network manager, wherein the data model comprises the object and an annotation that indicates a type of scope for the object;
apply, by the microservice, an operation indicated by the request to the object;
replicate, by the microservice based at least in part on instructions generated based on the annotation, data associated with the object to a second network manager of the plurality of network managers to cause the second network manager to apply the operation to an object stored by the second network manager.

18. The computing device of claim 17, wherein, to replicate the data, the one or more hardware-based processors are configured to:
determine, based on an attribute of the instance of the network device, a corresponding microservice application of the second network manager; and
invoke one or more application programming interface (API) calls for the corresponding microservice application.

19. The computing device of claim 17, the one or more hardware-based processors further configured to:
if the annotation comprises the strong-consistency annotation, atomically replicate data associated with the object to the second network manager.

20. The computing device of claim 17, the one or more hardware-based processors further configured to:
if the annotation comprises the eventual-consistency annotation, asynchronously replicate data associated with the object to the second network manager.

21. The computing device of claim 17, wherein the request comprises an HyperText Transfer Protocol (HTTP) request.

* * * * *